United States Patent
Koehler et al.

(10) Patent No.: US 9,334,675 B2
(45) Date of Patent: May 10, 2016

(54) PASSIVE SAFETY MECHANISM UTILIZING SELF-FRACTURING SHAPE MEMORY MATERIAL

(75) Inventors: Frederick B. Koehler, Tucson, AZ (US); Ward D. Lyman, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 682 days.

(21) Appl. No.: 13/586,188

(22) Filed: Aug. 15, 2012

(65) Prior Publication Data

US 2015/0084353 A1    Mar. 26, 2015

(51) Int. Cl.

| E05C 19/00 | (2006.01) |
|---|---|
| E05B 15/00 | (2006.01) |
| E05B 47/00 | (2006.01) |
| E05B 51/00 | (2006.01) |
| E05B 65/10 | (2006.01) |
| F03G 7/06 | (2006.01) |

(52) U.S. Cl.
CPC ............. *E05B 15/00* (2013.01); *E05B 47/0009* (2013.01); *E05B 51/005* (2013.01); *E05B 65/104* (2013.01); *F03G 7/065* (2013.01); *Y10T 292/57* (2015.04)

(58) Field of Classification Search
CPC ..................... Y10T 29/49865; E05B 47/0009; E05B 51/005; E05B 65/0075; E05B 65/0078; E05B 65/0082; E05B 65/104; F03G 7/065
USPC ................ 292/252, 9, 73, 75, 77, 256, 256.5, 292/256.71, 256.75, 258, DIG. 66, 287; 220/324, 326; 16/48.5; 285/381.1–381.5; 60/527–529; 403/2, 403/28, 322.2
See application file for complete search history.

(56) References Cited

U.S. PATENT DOCUMENTS

| 892,625 | A | * | 7/1908 | Sebring | .......................... 292/287 |
|---|---|---|---|---|---|
| 2,177,059 | A | * | 10/1939 | Derby | ............................ 16/48.5 |

(Continued)

FOREIGN PATENT DOCUMENTS

| GB | 2320277 A | 6/1998 |
|---|---|---|
| JP | 2006316830 A | 11/2006 |

(Continued)

OTHER PUBLICATIONS

International Search Report dated Mar. 11, 2010 in connection with International Patent Application No. PCT/US2009/06471.

(Continued)

*Primary Examiner* — Alyson M Merlino

(57) ABSTRACT

A system includes a structure having a first structural element and a second structural element. The system also includes a latch configured to releasably secure the first structural element to the second structural element. The latch includes first and second portions. The latch also includes a ball lock configured to hold the first and second portions of the latch together when the ball lock is engaged. The ball lock is also configured to allow the first and second portions of the latch to separate when the ball lock is disengaged. The latch further includes a shape memory material member configured to fracture when exposed to an elevated temperature and thereby disengage the ball lock. The shape memory material member could include an elongated structure that is configured to decrease in length when exposed to the elevated temperature. The elongated structure could have at least one notch.

20 Claims, 3 Drawing Sheets

(56) References Cited

U.S. PATENT DOCUMENTS

| | | | | |
|---|---|---|---|---|
| 2,178,929 | A | * | 11/1939 | Cline .............................. 403/2 |
| 3,672,715 | A | * | 6/1972 | Carson .......................... 292/257 |
| 3,779,004 | A | * | 12/1973 | Gloeckler ........................ 59/93 |
| 4,071,271 | A | * | 1/1978 | Bourrie et al. ................. 292/201 |
| 4,161,804 | A | * | 7/1979 | D'Hooge et al. .............. 16/48.5 |
| 4,489,964 | A | * | 12/1984 | Kipp et al. ..................... 285/374 |
| 4,647,090 | A | * | 3/1987 | Jones ............................ 292/161 |
| 4,716,731 | A | | 1/1988 | Sakai et al. |
| 4,945,727 | A | | 8/1990 | Whitehead et al. |
| 5,022,690 | A | * | 6/1991 | Coltrin et al. ................... 292/21 |
| 5,061,914 | A | | 10/1991 | Busch et al. |
| 5,105,178 | A | | 4/1992 | Krumme |
| 5,119,555 | A | | 6/1992 | Johnson |
| 5,129,753 | A | | 7/1992 | Wesley et al. |
| 5,160,233 | A | * | 11/1992 | McKinnis ..................... 411/433 |
| 5,245,738 | A | | 9/1993 | Johnson |
| 5,248,233 | A | * | 9/1993 | Webster ........................ 411/433 |
| 5,364,046 | A | | 11/1994 | Dobbs et al. |
| 5,916,466 | A | | 6/1999 | Dixon |
| 6,126,115 | A | * | 10/2000 | Carrier et al. ............... 244/173.3 |
| 6,126,371 | A | | 10/2000 | McCloskey |
| 6,622,971 | B1 | | 9/2003 | Robertson |
| 7,175,313 | B2 | * | 2/2007 | Bednara et al. ............... 362/265 |
| 7,219,687 | B2 | | 5/2007 | Vasquez et al. |
| 7,396,182 | B2 | | 7/2008 | Retat et al. |
| 2002/0062547 | A1 | | 5/2002 | Chiodo et al. |
| 2003/0128491 | A1 | | 7/2003 | Bueno Ruiz et al. |
| 2003/0145801 | A1 | * | 8/2003 | DeBien ......................... 119/772 |
| 2004/0200435 | A1 | * | 10/2004 | Debien ......................... 119/772 |
| 2005/0136270 | A1 | | 6/2005 | Besnoin et al. |
| 2006/0088366 | A1 | | 4/2006 | Retat et al. |
| 2006/0213455 | A1 | * | 9/2006 | Bien ............................. 119/772 |
| 2007/0028964 | A1 | | 2/2007 | Vasquez et al. |
| 2008/0034750 | A1 | | 2/2008 | Gao et al. |
| 2010/0097223 | A1 | * | 4/2010 | Kruest et al. ................. 340/572.1 |
| 2010/0139264 | A1 | | 6/2010 | Lyman et al. |
| 2011/0155265 | A1 | * | 6/2011 | Kikuchi et al. ............... 137/468 |
| 2011/0232278 | A1 | | 9/2011 | Lyman et al. |
| 2011/0232562 | A1 | | 9/2011 | Koehler et al. |
| 2011/0234362 | A1 | | 9/2011 | Koehler et al. |
| 2014/0102090 | A1 | * | 4/2014 | Koehler et al. ................. 60/527 |

FOREIGN PATENT DOCUMENTS

| | | | |
|---|---|---|---|
| WO | WO 9918312 | A1 * | 4/1999 |
| WO | WO 99/60235 | A2 | 11/1999 |
| WO | WO 2010/068266 | A1 | 6/2010 |

OTHER PUBLICATIONS

Written Opinion of the International Searching Authority dated Mar. 11, 2010 in connection with International Patent Application No. PCT/US2009/06471.

Roberto Gardi, "A non-pyrotechnic multipoint release system for deployable telescope, activated by shape memory alloy wires", Oct. 4-8, 2004, 2 pages.

Office Action dated May 10, 2011 in connection with U.S. Appl. No. 12/332,004.

International Search Report dated Nov. 14, 2013 in connection with International Patent Application No. PCT/US2013/045571.

Written Opinion of the International Searching Authority dated Nov. 14, 2013 in connection with International Patent Application No. PCT/US2013/045571.

Extended European Search Report dated Sep. 15, 2015 in connection with European Patent Application No. 13829230.5; 6 pages.

* cited by examiner

PASSIVE SAFETY MECHANISM UTILIZING SELF-FRACTURING SHAPE MEMORY MATERIAL

TECHNICAL FIELD

This disclosure is generally directed to triggers for safety mechanisms. More specifically, this disclosure is directed to a passive safety mechanism utilizing a self-fracturing shape memory material.

BACKGROUND

In various circumstances, people or equipment need to be protected from adverse situations that can arise in high-temperature environments. For example, air-to-air missiles and other ordnance are routinely stored or transported in containers. Unfortunately, a container carrying ordnance can sometimes be subjected to rising temperatures, which can lead to what are known as "slow cook-off" events and "fast cook-off" events.

A "slow cook-off" event occurs when ordnance is heated slowly until explosive material in the ordnance ignites. Because a casing that surrounds the explosive material is heated slowly, the casing can actually retain much of its original strength, even though the casing reaches an elevated temperature. As a result, ignition of the explosive material can actually result in detonation of the ordnance. This is clearly undesirable, particularly when the ordnance is located on a naval vessel, in a building, or in another location where people can be harmed or killed and equipment can be damaged from the resulting detonation.

A "fast cook-off" event occurs when ordnance is heated rapidly, which can significantly weaken the casing around the explosive material in the ordnance. This can still result in ignition of the explosive material, but it is less likely to result in detonation of the ordnance. Still, ignition of the explosive material is undesirable and can cause harm to people and damage to equipment.

SUMMARY

This disclosure provides a passive safety mechanism utilizing a self-fracturing shape memory material.

In a first embodiment, an apparatus includes a latch having a first portion, a second portion, and a ball lock. The ball lock is configured to hold the first and second portions of the latch together when the ball lock is engaged, and the ball lock is configured to allow the first and second portions of the latch to separate when the ball lock is disengaged. The latch further includes a shape memory material member configured to fracture when exposed to an elevated temperature and thereby disengage the ball lock.

In a second embodiment, a system includes a structure having a first structural element and a second structural element. The system also includes a latch configured to releasably secure the first structural element to the second structural element. The latch includes first and second portions. The latch also includes a ball lock configured to hold the first and second portions of the latch together when the ball lock is engaged. The ball lock is also configured to allow the first and second portions of the latch to separate when the ball lock is disengaged. The latch further includes a shape memory material member configured to fracture when exposed to an elevated temperature and thereby disengage the ball lock.

In a third embodiment, a method includes exposing a latch to an ambient environment. The latch includes a first portion, a second portion, a ball lock, and a shape memory material member. The ball lock holds the first and second portions of the latch together when the ball lock is engaged. The method also includes fracturing the shape memory material member when exposed to an elevated temperature to thereby disengage the ball lock. The ball lock allows the first and second portions of the latch to separate when the ball lock is disengaged Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
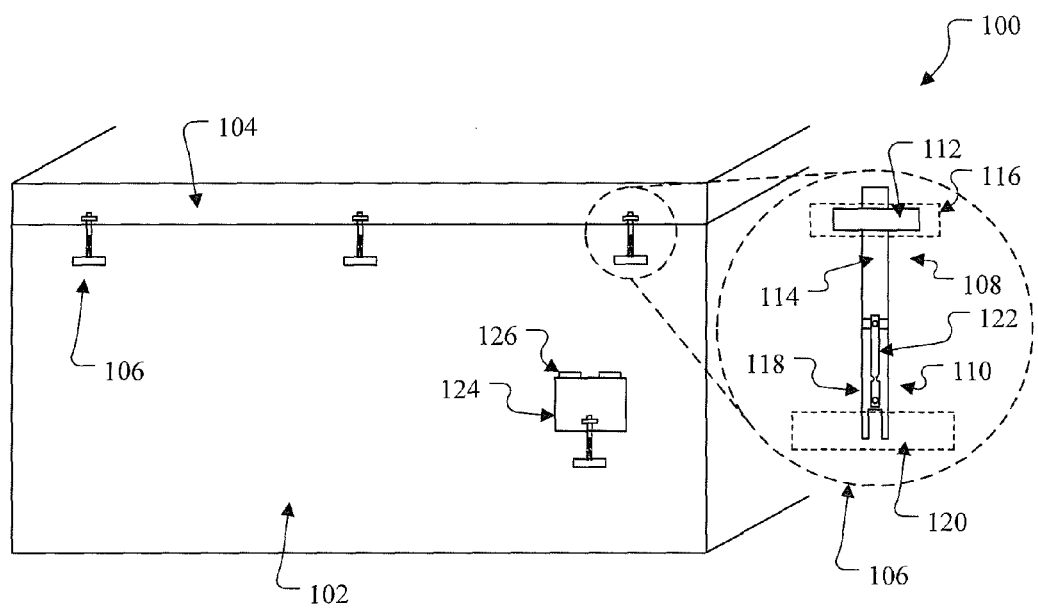
FIG. 1 illustrates an example container having a passive safety mechanism utilizing a self-fracturing shape memory material in accordance with this disclosure.

FIG. 1 illustrates an example container 100 having a passive safety mechanism utilizing a self-fracturing shape memory material in accordance with this disclosure. As described above, the container 100 can be used to store or transport air-to-air missiles and other ordnance. During a slow or fast cook-off event, the ordnance in the container 100 might heat up, ignite, and possibly even detonate. However, as described below, the container 100 includes a mechanism that can vent the container 100 when conditions arise that might lead to a slow cook-off event or a fast cook-off event. This helps to prevent over-pressurization of the container 100.

As shown in FIG. 1, the container 100 includes a main body 102 and a lid 104. The main body 102 represents the portion of the container 100 that defines an interior compartment used to hold cargo. The lid 104 represents the portion of the container 100 that is raised or removed to provide access to the interior compartment of the container 100 and that is lowered or replaced to cover the main body 102 of the container 100.

The container 100 can be used to store or transport any suitable cargo. The cargo could represent military ordnance or any other products, objects, materials, or other items being stored or transported in the container 100. The container 100 could have any suitable size, shape, and dimensions suitable for storing or transporting the desired cargo. The container 100 could also be formed from any suitable material(s), such as hardened plastic or metal.

In this example, the lid 104 is secured to the main body 102 of the container 100 using one or more latches 106. The latches 106 could be located on one side of the container 100 or on multiple sides of the container 100. When used on all sides of the container 100, the latches 106 could allow the lid 104 to be completely removed from the main body 102. When used on less than all sides of the container 100 (such as on a single side of the container 100), the lid 104 could be connected to the main body 102 by hinges or other mechanisms that allow the lid 104 to pivot on an edge of the main body 102.

At least one of the latches 106 uses a self-fracturing shape memory material member. When subjected to an elevated temperature, the shape memory material member can fracture, allowing the lid 104 to partially separate from the main body 102 along one or more sides of the container 100. This vents the container 100 and helps to prevent over-pressurization of the cargo inside the container 100.

Some details of the latch 106 are shown in FIG. 1. As shown here, the latch 106 generally includes an upper portion 108 and a lower portion 110. The upper and lower portions 108-110 are coupled together using a suitable connector, such as a ball lock. However, the portions 108-110 separate when the shape memory material member in the latch 106 fractures.

In this example, the upper portion 108 of the latch 106 includes a retainer 112, which permanently or temporarily attaches the upper portion 108 of the latch 106 to the lid 104. For example, the retainer 112 could represent a structure that is wider than a central body 114 of the upper portion 108. The retainer 112 can be attached to the lid 104 in any suitable manner. For instance, the retainer 112 could fit within a recess 116 of the lid 104, where the central body 114 of the upper portion 108 passes through an opening of the recess 116. The retainer 112 includes any suitable structure for permanently or temporarily securing the upper portion 108 of the latch 106 to the lid of a container. In some embodiments, the retainer 112 represents a half barrel nut. However, the upper portion 108 of the latch 106 could be permanently or removably secured to the lid 104 of the container 100 in any other suitable manner.

The lower portion 110 of the latch 106 includes a central body 118, and the lower end of the central body 118 attaches to a handle 120. The handle 120 can also be attached to the main body 102 of the container 100. The handle 120 can be used, for example, to lift the retainer 112 out of the recess 116 or to pull the retainer 112 into the recess 116, thereby allowing an operator to open and close the lid 104.

As described in more detail below, the central body 114 of the upper portion 108 and the central body 118 of the lower portion 110 are removably coupled together by a locking mechanism, such as a ball lock. Note that the locking mechanism holds the upper and lower portions 108-110 "together," which includes both physical contact between the portions 108-110 and close proximity of the portions 108-110. Also, a shape memory material member 122 helps to keep the ball lock or other connector engaged to keep the central body 114 of the upper portion 108 connected to the central body 118 of the lower portion 110. When exposed to an elevated temperature, the shape memory material member 122 fractures, allowing the upper and lower portions 108-110 to separate. When this occurs, the latch 106 splits and releases the lid 104 from the main body 102 of the container 100, venting the container 100. In this document, the phrase "elevated temperature" refers to a temperature at or above which a shape memory material member breaks.

The shape memory material member 122 is fabricated from at least one material that changes shape when heated. For example, the member 122 can be fabricated by stretching a shape memory material to form an elongated structure, and the shape memory material can shrink when exposed to an elevated temperature. By securing the ends of the shape memory material member 122 to the central body 114 of the upper portion 108 and the central body 118 of the lower portion 110, shrinkage of the shape memory material quickly causes the member 122 to fracture.

The shape memory material member 122 can be formed from any suitable material(s), such as a shape memory alloy. As particular examples, the shape memory material member 122 could be formed from a nickel-titanium alloy (such as Nitinol), a titanium-nickel alloy, a copper-zinc-aluminum alloy, a copper-aluminum-nickel alloy, or a nickel-titanium-hafnium alloy. The shape memory material member 122 can also be formed in any suitable manner. In addition, the shape memory material member 122 can have any suitable shape, such as an elongated structure having one or more notches. In particular embodiments, the shape memory material member 122 can be designed to fracture at a desired temperature, such as a temperature between about 35° C. and about 150° C. For instance, the composition, thickness, or notch size of the member 122 or the amount of stretching used to fabricate the member 122 could be varied to alter the temperature at which the member 122 fractures.

Additional details regarding the use of a shape memory material member 122 in a latch 106 are provided below. In some embodiments, the latch 106 can be retro-fitted onto existing containers used by the United States military or other organizations. For example, conventional containers may include over-center type clamp/latch devices for securing lids of the containers. The latch 106 could be designed as a drop-in or near-drop-in replacement for the over-center type clamp/latch devices, enabling rapid deployment of the latches 106.

Note that while latches 106 are shown in FIG. 1 as securing the entire lid 104 of the container 100, one or more latches 106 could be used in other ways in the container 100. For instance, one or more latches 106 could be used to operate a vent 124 for the container 100. For example, the vent 124 could represent a smaller panel that is attached to the container 100 using one or more hinges 126. When the vent 124 opens, this can relieve an over-pressure situation within the container 100. The latch 106 could operate the vent 124 in any suitable manner. For example, the latch 106 could simply hold the vent 124 against the body 102 of the container 100 and release the vent 124 when the latch 106 separates. The latch 106 could also rotate a portion of the vent 124 to create an opening through the container 100. The vent 124 could be located at any suitable location of the container 100, such as on the front, side, back, top, or bottom surface. In particular embodiments, the panel 124 is located on the front, side, or back surface of the container 100 so that the container 100 can be vented even when multiple containers 100 are stacked. The panel 124 can have any suitable size, shape, and dimensions. Also, each hinge 126 includes any suitable structure allowing rotatable movement of a panel.

Although FIG. 1 illustrates one example of a container 100 having a passive safety mechanism utilizing a self-fracturing shape memory material, various changes may be made to FIG. 1. For example, the container 100 could include any number of latches 106 and/or vents 124 on any number of sides of the container 100.

Figure 2:
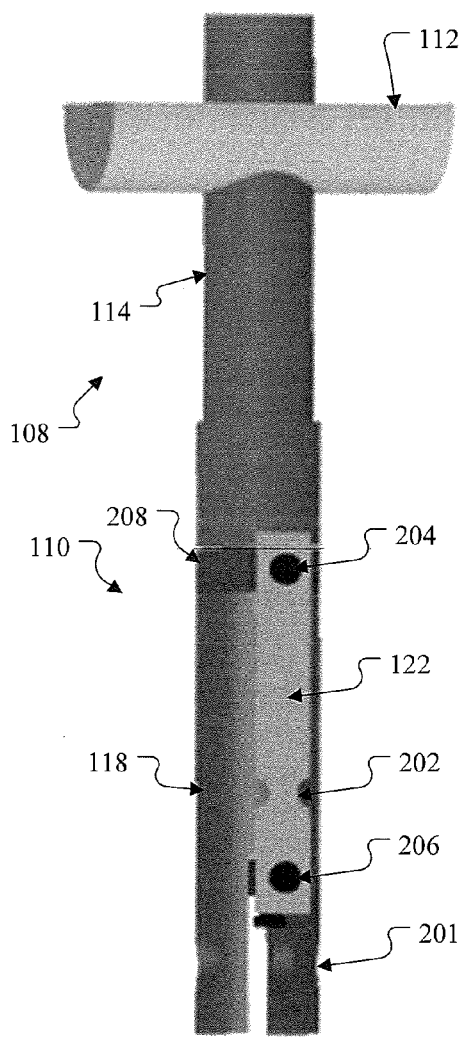
FIGS. 2 and 3 illustrate an example passive safety mechanism utilizing a self-fracturing shape memory material in accordance with this disclosure.
Figure 3:
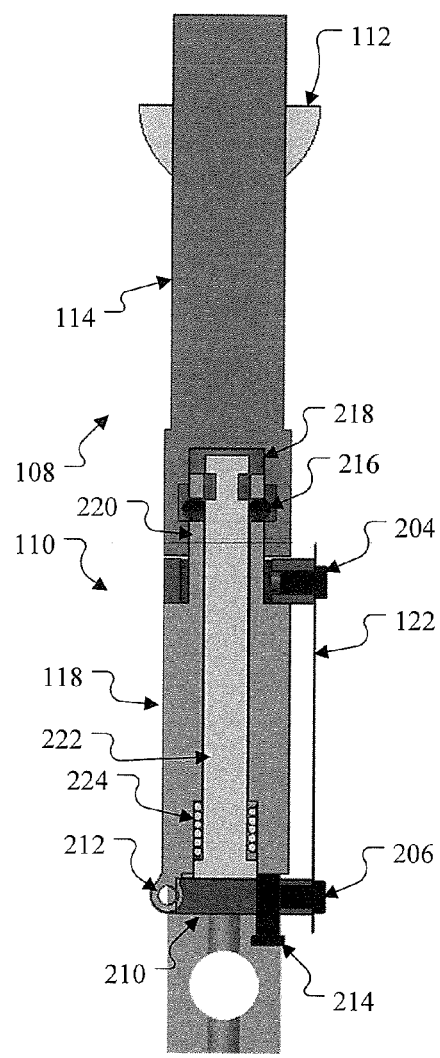

FIGS. 2 and 3 illustrate an example passive safety mechanism utilizing a self-fracturing shape memory material in accordance with this disclosure. In particular, FIG. 2 illustrates additional details of a portion of the latch 106 using the shape memory material member 122, and FIG. 3 illustrates a side view of the latch 106 from FIG. 2 assuming the latch 102 has been cut in half along its length. For ease of explanation, the latch 106 is described as being used with the container 100 of FIG. 1, although the latch 106 could be used with any other suitable device or system.

As shown in FIGS. 2 and 3, the central body 114 in the upper portion 108 of the latch 106 is attached to the retainer 112. In this example, the retainer 112 represents a half barrel nut. Also, at least part of the central body 114 can be threaded, allowing the retainer 112 to be placed in different locations along the central body 114. This allows the tension placed on the latch 106 during use to be adjusted as needed. Moreover, the central body 118 in the lower portion 110 of the latch 106 includes separated portions 201, each with a hole. These portions 201 of the central body 118 can be attached to the handle 120.

The shape memory material member 122 includes a notched section 202. The notched section 202 represents a portion of the member 122 having a smaller width than the other portions of the member 122, so the member 122 is weaker in the notched section 202. The notched section 202 therefore represents the area where the shape memory material member 122 is likely to fracture when the shape memory material is heated. The shape memory material member 122 can have any suitable notch(es) in the notched section 202. In this example, the notches are semicircular, although the notches could have any other suitable shape(s) (such as triangular).

The latch 106 here includes two shape memory material anchors 204-206. The anchors 204-206 are connected to ends of the shape memory material member 122 and hold the shape memory material member 122 in place. The anchors 204-206 also help to keep the ends of the shape memory material member 122 from moving significantly towards each other when the member 122 is heated, creating stress in the member 122 and eventually causing the member 122 to fracture. Each anchor 204-206 includes any suitable structure for holding a shape memory material member in place.

In this example, the anchors 204-206 include pin-type structures that are inserted into holders 208-210. The holders 208-210 represent any suitable structures for holding retainers that are used to secure a shape memory material member. In this example, the holder 208 represents an annular structure, and the holder 210 fits between the separated portions 201 of the central body 118. The holder 210 is attached to a hinge 212, which in this example forms part of the central body 118 in the lower portion 110 of the latch 106. Because the holder 210 fits between the separated portions 201 of the central body 118, the holder 210 can rotate downward between the portions 201 of the central body 118 when the shape memory material member 122 fractures.

A tensioner 214 can be used to adjust the tension placed on the shape memory material member 122. For example, the tensioner 214 could represent a threaded structure or other structure that can physically move the anchor 206 towards or away from the anchor 204, altering the tension placed on the shape memory material member 122. The tensioner 214 includes any suitable structure for physically altering a distance between two retainers for a shape memory material member.

The upper and lower portions 108-110 of the latch 106 are secured together using a connector. In this example embodiment, the connector represents a ball lock, although other types of connectors could be used to secure the upper and lower portions 108-110 of the latch 106. The ball lock includes multiple balls 216 within a recess 218 of the central body 114. A projection 220 from the central body 118 also fits within the recess 218 of the central body 114, and the holder 210 is located around the projection 220. When the projection 220 from the central body 118 is inserted into the recess 218 of the central body 114, the balls 216 partially fit into openings of the projection 220. The balls 216 therefore help to secure the projection 220 within the recess 218, engaging the ball lock and locking the upper and lower portions 108-110 of the latch 106 together.

The latch 106 also includes a retaining pin 222 and a spring 224. When the retaining pin 222 is inserted through the projection 220 of the central body 118 and into the recess 218, the retaining pin 222 holds the balls 216 within the recess 218. This engages the ball lock, locking the central bodies 114 and 118 together. When the retaining pin 222 is removed from the recess 218 and the projection 220, this allows the balls 216 to escape the recess 218. This disengages the ball lock, unlocking the central bodies 114 and 118 from one another and allowing the upper and lower portions 108-110 of the latch 106 to separate.

The spring 224 pushes against the retaining pin 222 and the central body 118 of the lower portion 110. As long as the shape memory material member 122 remains unbroken, the retaining pin 222 is held in place, and the latch 106 remains closed. When the shape memory material member 122 breaks, the spring 224 pushes the retaining pin 222 down, which in turn pushes the holder 210 and causes the holder 210 to rotate down between the portions 201 of the central body 118. The retaining pin 222 is therefore pushed out of the projection 220 of the central body 118, and the balls 216 fall inward and out of the projection 220 of the central body 118. This disengages the ball lock and allows the upper and lower portions 108-110 of the latch 106 to physically separate.

The retaining pin 222 includes any suitable structure for securing or releasing balls of a ball lock to engage and disengage the ball lock. The spring 224 includes any suitable structure for biasing a retaining pin to move in a particular direction.

In this way, a self-fracturing shape memory material member 122 can be used to passively trigger a safety mechanism. In the example shown in FIG. 1, the safety mechanism is the opening of the lid 104 of the container 100 to vent the container 100. However, other safety mechanisms could be triggered using a self-fracturing shape memory material member 122 in a latch 106.

Although FIGS. 2 and 3 illustrate one example of a passive safety mechanism utilizing a self-fracturing shape memory material, various changes may be made to FIGS. 2 and 3. For example, as noted above, a connector other than a ball lock could be used to secure the upper and lower portions 108-110 of the latch 106 together until released by the shape memory material member 122.

Figure 4:
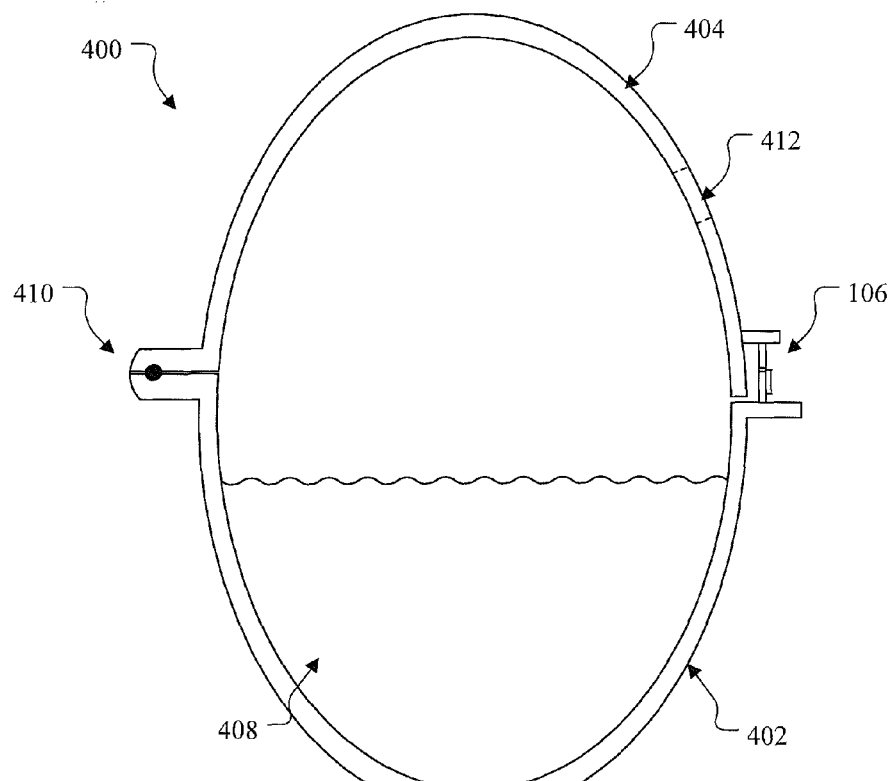
FIG. 4 illustrates another example structure having a passive safety mechanism utilizing a self-fracturing shape memory material in accordance with this disclosure.

FIG. 4 illustrates another example structure having a passive safety mechanism utilizing a self-fracturing shape memory material in accordance with this disclosure. As shown in FIG. 4, the boiler 400 generally includes a boiler base 402 and a boiler lid 404. The boiler base 402 generally represents the portion of the boiler 400 that receives a liquid or other material 408 to be heated. The boiler lid 404 generally represents the portion of the boiler 400 that covers the base 402. The boiler base 402 and boiler lid 404 can be sealed together during operation to prevent the material 408 from escaping along the junction of the base 402 and the lid 404. The lid 404 is coupled to the base 402 using at least one hinge 410.

In this example, one or more latches 106 can also be used to secure the boiler base 402 and the boiler lid 404. If the shape memory material member 122 of the latch 106 breaks during operation, the boiler lid 404 can separate partially from the boiler base 402, venting the interior compartment of the boiler 400.

Once again, the latch 106 is shown in FIG. 4 as securing the boiler lid 404 to the boiler base 402. However, one or more latches 106 could be used in other ways in the boiler 400. For instance, one or more latches 106 could be used to operate a vent 412 for the boiler 400. One or multiple vents 412 could be used with the boiler 400, and the vent(s) 412 could be placed in any suitable location(s).

Although FIG. 4 illustrates another example of a structure having a passive safety mechanism utilizing a self-fracturing shape memory material, various changes may be made to FIG. 4. For example, the boiler 400 could include any number of latches 106 at any number of location around the boiler 400.

Note that securing a container or boiler lid represents example ways that a shape memory material member 122 in a latch 106 can be used to trigger a safety mechanism (venting the container 100 or boiler 400 at elevated temperatures). This functionality could be used to trigger any other suitable safety mechanism, such as the separation of any structural element in a structure from another structural element in the structure. The latch 106 could find a wide range of uses in both military and non-military applications. As example military uses, the latch 106 can be used as a passively-activated mechanism in containers for ordnance and as a release for general non-exploding actuators or other devices. As example non-military uses, many commercial industrial safety mechanisms could use the latch 106, such as in devices and systems where a temperature spike can cause over-pressurization. Particular applications can include over-pressure releases for pressure vessels, flammable chemical containment vessels, steam plants, and commercial non-exploding actuators.

Also note that the above has described a lid or vent opening when a latch 106 separates, which could occur due to over-pressurization within the container 100 or boiler 400. However, other mechanisms could be used to open a lid, vent, or other structure upon separation of one or more latches 106. For example, spring-loaded hinges or other spring-loaded mechanisms or a hydraulic mechanism could be used to open a lid or vent upon separation of one or more latches 106. In general, any mechanism that can open a lid, vent, or other structure upon separation of one or more latches 106 could be used.

In addition, one or more identification mechanisms could be used to help identify a separated latch 106. For example, a latch 106 could be connected to a movable flag that changes position when the latch 106 separates, a color-changing device that changes color when the latch 106 separates, or a dye-pack that breaks when the latch 106 separates. In these embodiments, one or more latches 106 could be used to secure a lid or vent, while one or more other latches 106 could be used to trigger an identification mechanism. In other embodiments, an identification mechanism could be incorporated into the latch 106 itself. For instance, the latch 106 could include a flag, such as on the holder 210 or the retaining pin 222, that becomes visible when the latch 106 separates. Any other suitable identification mechanism(s) could be used here.

Figure 5:
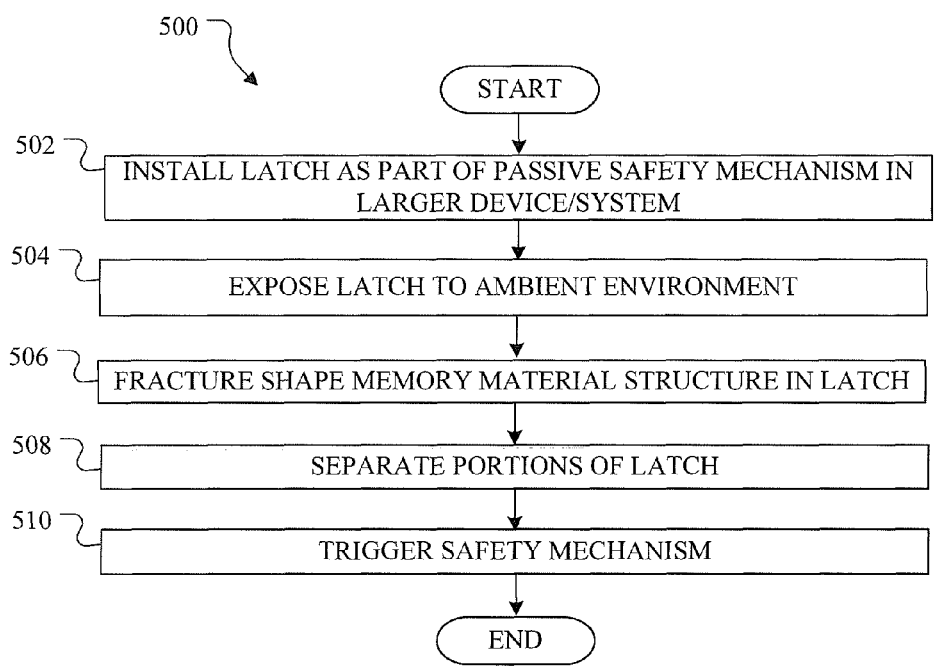
FIG. 5 illustrates an example method for operating a passive safety mechanism utilizing a self-fracturing shape memory material in accordance with this disclosure.

FIG. 5 illustrates an example method 500 for operating a passive safety mechanism utilizing a self-fracturing shape memory material in accordance with this disclosure. As shown in FIG. 5, a latch is installed as part of a passive safety mechanism in a larger device or system at step 502. This could include, for example, a user installing one or more latches 106 as part of a container 100, where the latches 106 are used to secure the lid 104 to the main body 102 of the container 100. As another example, this could include a user installing one or more latches 106 as part of a boiler 400, where the latches 106 are used to secure different portions 402-404 of the boiler 400 together. In general, the latches 106 could be used to help secure different structural elements of a structure together, such as in any structure where high temperatures and over-pressurization can cause significant harm or damage. The latch 106 is exposed to the ambient environment at step 504. This could include, for example, exposing the latch 106 to various environments as the container 100 is moved to one or more locations. This could also include exposing the latch 106 to an environment around the boiler 400.

Eventually, the latch could be exposed to an elevated temperature, and a shape memory material member in the latch fractures at step 506. This could include, for example, the shape memory material member 122 fracturing when the temperature in the ambient environment reaches an elevated level, such as between about 35° C. to about 150° C. The temperature at which the shape memory material member 122 breaks could be based on various factors, such as the composition of the member 122, the size of the notches in the member 122, the thickness of the member 122, and the way in which the member 122 was fabricated. The shape memory material member 122 could fracture at its notched section 202 as that can represent the area of smallest width in the member 122.

When the shape memory material member fractures, multiple portions of the latch separate from one another at step 508. This could include, for example, a ball lock in the latch 106 disengaging after the shape memory material member 122 fractures. In particular, this can include the spring 224 pushing the retaining pin 222 out of the recess 218 in the central body 114 in the upper portion 108 of the latch 106 as the holder 210 rotates away from the central body 118 at the hinge 212. This can also include the balls 216 of the ball lock falling out of the recess 218 in the central body 114. This disengages the ball lock, separating the upper and lower portions 108-110 of the latch 106.

The separation of the latch portions triggers a safety mechanism at step 510. This could include, for example, the latch 106 separating so that the lid 104 of the container 100 can open, venting the interior compartment of the container 100. Similarly, this can include the latch 106 separating so that the different portions 402-404 of the boiler 400 can separate. However, any other suitable safety mechanism(s) could be triggered using the latch 106.

Although FIG. 5 illustrates one example of a method 500 for operating a passive safety mechanism utilizing a self-fracturing shape memory material, various changes may be made to FIG. 5. For example, while shown as a series of steps, some steps in FIG. 5 could overlap, occur in parallel, or occur any number of times. As particular examples, multiple latches 106 could be installed as part of the passive safety mechanism, and the latches 106 could be exposed to multiple environments before the shape memory material member 122 fractures (assuming it ever fractures).

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. Directional terms such as "upper," "lower," "up," and "down" refer to directions within the figures and do not require any particular directional arrangement of components or directional use of a device.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a latch comprising:
    a first portion comprising a recess;
    a second portion comprising a projection configured to fit within the recess;
    a ball lock comprising at least one ball, the ball lock configured to hold the first and second portions of the latch together when the ball lock is engaged and to allow the first and second portions of the latch to separate when the ball lock is disengaged, wherein the ball lock is configured to (i) engage the first and second portions of the latch by holding the at least one ball in at least one opening of the projection while the projection is within the recess when the ball lock is engaged and (ii) disengage from at least one of the first portion or the second portion of the latch when the ball lock is disengaged; and
    a shape memory material member connected to at least one of the first and second portions of the latch, the shape memory material member configured to fracture when exposed to an elevated temperature and thereby disengage the ball lock.

2. The apparatus of claim 1, wherein:
the at least one ball is configured to fit within the recess in the first portion of the latch; and
the latch further comprises a pin configured to:
    extend through at least part of the second portion of the latch into the recess in the first portion of the latch, wherein the at least part of the second portion of the latch includes the projection; and
    retain the at least one ball within the recess in order to engage the ball lock.

3. An apparatus comprising:
a latch comprising:
    a first portion;
    a second portion;
    a ball lock configured to hold the first and second portions of the latch together when the ball lock is engaged and to allow the first and second portions of the latch to separate when the ball lock is disengaged, wherein the ball lock is configured to (i) engage the first and second portions of the latch when the ball lock is engaged and (ii) disengage from at least one of the first portion or the second portion of the latch when the ball lock is disengaged; and
    a shape memory material member connected to at least one of the first and second portions of the latch, the shape memory material member configured to fracture when exposed to an elevated temperature and thereby disengage the ball lock;
wherein:
    the ball lock comprises at least one ball configured to fit within a recess in the first portion of the latch;
    the latch further comprises a pin configured to extend through at least part of the second portion of the latch into the recess in the first portion of the latch, the pin also configured to retain the at least one ball within the recess in order to engage the ball lock;
    the second portion of the latch comprises a central body and a holder connected to the shape memory material member, the holder coupled to the central body at a hinge;
    the latch further comprises a spring configured to push the pin against the holder;
    the holder is configured to rotate away from the pin when the shape memory material member fractures; and
    the spring is configured to move the pin out of the recess to disengage the ball lock when the shape memory material member fractures.

4. The apparatus of claim 3, wherein the latch further comprises:
    a first anchor coupled to the holder and to a first end of the shape memory material member; and
    a second anchor coupled to a second holder and to a second end of the shape memory material member.

5. The apparatus of claim 1, wherein:
    the shape memory material member comprises an elongated structure; and
    the elongated structure is configured to decrease in length when exposed to the elevated temperature.

6. The apparatus of claim 5, wherein the elongated structure comprises at least one notch that defines a reduced-width portion of the elongated structure.

7. The apparatus of claim 1, further comprising:
    a retainer coupled to the first portion of the latch and configured to couple the latch to an external structure.

8. The apparatus of claim 7, further comprising:
    a handle coupled to the second portion of the latch and configured to cause the latch to raise and lower the retainer.

9. A system comprising:
    a structure having a first structural element and a second structural element; and
    a latch configured to releasably secure the first structural element to the second structural element, wherein the latch comprises:
        a first portion comprising a recess;
        a second portion comprising a projection configured to fit within the recess;
        a ball lock comprising at least one ball, the ball lock configured to hold the first and second portions of the latch together when the ball lock is engaged and to allow the first and second portions of the latch to separate when the ball lock is disengaged, wherein the ball lock is configured to (i) engage the first and second portions of the latch by holding the at least one ball in at least one opening of the projection while the projection is within the recess when the ball lock is engaged and (ii) disengage from at least one of the first portion or the second portion of the latch when the ball lock is disengaged; and
        a shape memory material member connected to at least one of the first and second portions of the latch, the shape memory material member configured to fracture when exposed to an elevated temperature and thereby disengage the ball lock.

10. The system of claim 9, wherein:
the at least one ball is configured to fit within the recess in the first portion of the latch; and the latch further comprises a pin configured to:
  extend through at least part of the second portion of the latch into the recess in the first portion of the latch, wherein the at least part of the second portion of the latch includes the projection; and
  retain the at least one ball within the recess in order to engage the ball lock.

11. A system comprising:
a structure having a first structural element and a second structural element; and
a latch configured to releasably secure the first structural element to the second structural element, wherein the latch comprises:
  a first portion;
  a second portion;
  a ball lock configured to hold the first and second portions of the latch together when the ball lock is engaged and to allow the first and second portions of the latch to separate when the ball lock is disengaged, wherein the ball lock is configured to (i) engage the first and second portions of the latch when the ball lock is engaged and (ii) disengage from at least one of the first portion or the second portion of the latch when the ball lock is disengaged; and
  a shape memory material member connected to at least one of the first and second portions of the latch, the shape memory material member configured to fracture when exposed to an elevated temperature and thereby disengage the ball lock;
wherein:
  the ball lock comprises at least one ball configured to fit within a recess in the first portion of the latch;
  the latch further comprises a pin configured to extend through at least part of the second portion of the latch into the recess in the first portion of the latch, the pin also configured to retain the at least one ball within the recess in order to engage the ball lock;
  the second portion of the latch comprises a central body and a holder connected to the shape memory material member, the holder coupled to the central body at a hinge;
  the latch further comprises a spring configured to push the pin against the holder;
  the holder is configured to rotate away from the pin when the shape memory material member fractures; and
  the spring is configured to move the pin out of the recess to disengage the ball lock when the shape memory material member fractures.

12. The system of claim 11, wherein the latch further comprises:
a first anchor coupled to the holder and to a first end of the shape memory material member; and
a second anchor coupled to a second holder and to a second end of the shape memory material member.

13. The system of claim 9, wherein:
the shape memory material member comprises an elongated structure; and
the elongated structure is configured to decrease in length when exposed to the elevated temperature.

14. The system of claim 13, wherein the elongated structure comprises at least one notch that defines a reduced-width portion of the elongated structure.

15. The system of claim 9, wherein the system further comprises at least one additional latch configured to releasably secure the first structural element to the second structural element.

16. A method comprising:
exposing a latch to an ambient environment, wherein the latch comprises a first portion including a recess, a second portion including a projection configured to fit within the recess, a ball lock comprising at least one ball, and a shape memory material member connected to at least one of the first and second portions of the latch, wherein the ball lock holds the first and second portions of the latch together when the ball lock is engaged by holding the at least one ball in at least one opening of the projection while the projection is within the recess; and
fracturing the shape memory material member when exposed to an elevated temperature to thereby disengage the ball lock, wherein the ball lock allows the first and second portions of the latch to separate when the ball lock is disengaged;
wherein the ball lock (i) engages the first and second portions of the latch when the ball lock is engaged and (ii) disengages from at least one of the first portion or the second portion of the latch when the ball lock is disengaged.

17. The method of claim 16, wherein:
the at least one ball is configured to fit within the recess in the first portion of the latch;
the latch further comprises a pin; and
when the ball lock is engaged, the pin extends through at least part of the second portion of the latch into the recess in the first portion of the latch and retains the at least one ball within the recess, wherein the at least part of the second portion of the latch includes the projection.

18. A method comprising:
exposing a latch to an ambient environment, wherein the latch comprises a first portion, a second portion, a ball lock, and a shape memory material member connected to at least one of the first and second portions of the latch, wherein the ball lock holds the first and second portions of the latch together when the ball lock is engaged; and
fracturing the shape memory material member when exposed to an elevated temperature to thereby disengage the ball lock, wherein the ball lock allows the first and second portions of the latch to separate when the ball lock is disengaged;
wherein the ball lock (i) engages the first and second portions of the latch when the ball lock is engaged and (ii) disengages from at least one of the first portion or the second portion of the latch when the ball lock is disengaged;
wherein:
  the ball lock comprises at least one ball configured to fit within a recess in the first portion of the latch;
  the latch further comprises a pin;
  when the ball lock is engaged, the pin extends through at least part of the second portion of the latch into the recess in the first portion of the latch and retains the at least one ball within the recess;
  the second portion of the latch comprises a central body and a holder connected to the shape memory material member, the holder coupled to the central body at a hinge;
  the latch further comprises a spring configured to push the pin against the holder; and
  when the shape memory material member fractures, the holder rotates away from the pin and the spring moves the pin out of the recess to disengage the ball lock.

19. The method of claim 16, further comprising:
triggering a safety mechanism in response to the fracturing of the shape memory material member.

20. The method of claim 19, wherein triggering the safety mechanism comprises at least partially opening a lid or panel of a structure to thereby vent an interior compartment within the structure.

* * * * *